United States Patent
Gally et al.

(10) Patent No.: US 7,317,568 B2
(45) Date of Patent: Jan. 8, 2008

(54) SYSTEM AND METHOD OF IMPLEMENTATION OF INTERFEROMETRIC MODULATORS FOR DISPLAY MIRRORS

(75) Inventors: Brian J. Gally, Los Gatos, CA (US); William J. Cummings, Millbrae, CA (US)

(73) Assignee: IDC, LLC, San Fransisco, CA (US)

( * ) Notice: Subject to any disclaimer, the term of this patent is extended or adjusted under 35 U.S.C. 154(b) by 178 days.

(21) Appl. No.: 11/194,046

(22) Filed: Jul. 29, 2005

(65) Prior Publication Data

US 2006/0077521 A1    Apr. 13, 2006

Related U.S. Application Data

(60) Provisional application No. 60/613,298, filed on Sep. 27, 2004.

(51) Int. Cl.
    *G02B 26/00* (2006.01)
(52) U.S. Cl. ....................... 359/290; 359/291
(58) Field of Classification Search ............ 359/290, 359/291, 292, 295, 298, 220, 223, 224, 320, 359/322, 324
    See application file for complete search history.

(56) References Cited

U.S. PATENT DOCUMENTS

| | | |
|---|---|---|
| 2,534,846 A | 12/1950 | Ambrose et al. |
| 3,184,600 A | 5/1965 | Potter |
| 3,371,345 A | 2/1968 | Lewis |
| 3,410,363 A | 11/1968 | Schwartz |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,746,785 A | 7/1973 | Goodrich |
| 3,813,265 A | 5/1974 | Marks |
| 3,955,880 A | 5/1976 | Lierke |
| 4,099,854 A | 7/1978 | Decker et al. |
| 4,228,437 A | 10/1980 | Shelton |
| 4,347,983 A | 9/1982 | Bodai |
| 4,377,324 A | 3/1983 | Durand et al. |

(Continued)

FOREIGN PATENT DOCUMENTS

EP    0261897 A2    3/1988

(Continued)

OTHER PUBLICATIONS

Bass, "Handbook of Optics, vol. I, Fundamentals, Techniques, and Design, Second Edition," McGraw-Hill, Inc., New York, pp. 2.29-2.36 (1995).

(Continued)

*Primary Examiner*—Ricky Mack
*Assistant Examiner*—Tuyen Tra
(74) *Attorney, Agent, or Firm*—Knobbe Martens Olson & Bear LLP

(57) ABSTRACT

A specular interferometric modulator array is configured to be at least partially selectably reflective. As such, the array forms a mirror surface having the capability of displaying information to the user while simultaneously being used as a specular mirror. The displayed information may be based on information from an external source, may be programmable, and may be based on user input.

59 Claims, 8 Drawing Sheets

U.S. PATENT DOCUMENTS

| | | |
|---|---|---|
| 4,389,096 A | 6/1983 | Hori et al. |
| 4,392,711 A | 7/1983 | Moraw et al. |
| 4,403,248 A | 9/1983 | Te Velde |
| 4,441,791 A | 4/1984 | Hornbeck |
| 4,445,050 A | 4/1984 | Marks |
| 4,459,182 A | 7/1984 | Te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,900,136 A | 2/1990 | Goldburt et al. |
| 4,900,395 A | 2/1990 | Syverson et al. |
| 4,954,789 A | 9/1990 | Sampsell |
| 4,956,619 A | 9/1990 | Hornbeck |
| 4,965,562 A | 10/1990 | Verhulst |
| 4,977,009 A | 12/1990 | Anderson et al. |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,126,836 A | 6/1992 | Um |
| 5,142,405 A | 8/1992 | Hornbeck |
| 5,142,414 A | 8/1992 | Koehler |
| 5,148,157 A | 9/1992 | Florence |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,185,660 A | 2/1993 | Um |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,244,707 A | 9/1993 | Shores |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,304,419 A | 4/1994 | Shores |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,353,114 A | 10/1994 | Hansen |
| 5,358,601 A | 10/1994 | Cathey |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,450,205 A | 9/1995 | Sawin et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,580,144 A | 12/1996 | Stroomer |
| 5,581,272 A | 12/1996 | Conner et al. |
| 5,583,688 A | 12/1996 | Hornbeck |
| 5,589,852 A | 12/1996 | Thompson et al. |
| 5,591,379 A | 1/1997 | Shores |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoads et al. |
| 5,619,366 A | 4/1997 | Rhoads et al. |

| | | | | | | |
|---|---|---|---|---|---|---|
| 5,629,790 A | 5/1997 | Neukermans et al. | | 6,606,175 B1 | 8/2003 | Sampsell et al. |
| 5,636,052 A | 6/1997 | Arney et al. | | 6,625,047 B2 | 9/2003 | Coleman, Jr. |
| 5,636,185 A | 6/1997 | Brewer et al. | | 6,630,786 B2 | 10/2003 | Cummings et al. |
| 5,646,768 A | 7/1997 | Kaeriyama | | 6,632,698 B2 | 10/2003 | Ives |
| 5,650,881 A | 7/1997 | Hornbeck | | 6,643,069 B2 | 11/2003 | Dewald |
| 5,654,741 A | 8/1997 | Sampsell et al. | | 6,650,455 B2 | 11/2003 | Miles |
| 5,657,099 A | 8/1997 | Doherty et al. | | 6,666,561 B1 | 12/2003 | Blakley |
| 5,659,374 A | 8/1997 | Gale, Jr. et al. | | 6,674,090 B1 | 1/2004 | Chua et al. |
| 5,665,997 A | 9/1997 | Weaver et al. | | 6,674,562 B1 | 1/2004 | Miles et al. |
| 5,673,139 A | 9/1997 | Johnson | | 6,680,792 B2 | 1/2004 | Miles |
| 5,683,591 A | 11/1997 | Offenberg | | 6,710,908 B2 | 3/2004 | Miles et al. |
| 5,699,074 A | 12/1997 | Sutherland et al. | | 6,741,377 B2 | 5/2004 | Miles |
| 5,703,710 A | 12/1997 | Brinkman et al. | | 6,741,384 B1 | 5/2004 | Martin et al. |
| 5,710,656 A | 1/1998 | Goossen | | 6,741,503 B1 | 5/2004 | Farris et al. |
| 5,726,480 A | 3/1998 | Pister | | 6,747,785 B2 | 6/2004 | Chen et al. |
| 5,739,945 A | 4/1998 | Tayebati | | 6,747,800 B1 | 6/2004 | Lin |
| 5,745,193 A | 4/1998 | Urbanus et al. | | 6,762,873 B1 | 7/2004 | Coker et al. |
| 5,745,281 A | 4/1998 | Yi et al. | | 6,775,174 B2 | 8/2004 | Huffman et al. |
| 5,771,116 A | 6/1998 | Miller et al. | | 6,778,155 B2 | 8/2004 | Doherty et al. |
| 5,784,190 A | 7/1998 | Worley | | 6,794,119 B2 | 9/2004 | Miles |
| 5,784,212 A | 7/1998 | Hornbeck | | 6,811,267 B1 | 11/2004 | Allen et al. |
| 5,793,504 A | 8/1998 | Stoll | | 6,819,469 B1 | 11/2004 | Koba |
| 5,808,780 A | 9/1998 | McDonald | | 6,822,628 B2 | 11/2004 | Dunphy et al. |
| 5,815,141 A | 9/1998 | Phares | | 6,829,132 B2 | 12/2004 | Martin et al. |
| 5,818,095 A | 10/1998 | Sampsell | | 6,853,129 B1 | 2/2005 | Cummings et al. |
| 5,825,528 A | 10/1998 | Goosen | | 6,855,610 B2 | 2/2005 | Tung et al. |
| 5,835,255 A | 11/1998 | Miles | | 6,859,218 B1 | 2/2005 | Luman et al. |
| 5,842,088 A | 11/1998 | Thompson | | 6,861,277 B1 | 3/2005 | Monroe et al. |
| 5,912,758 A | 6/1999 | Knipe et al. | | 6,862,022 B2 | 3/2005 | Slupe |
| 5,943,158 A | 8/1999 | Ford et al. | | 6,862,029 B1 | 3/2005 | D'Souza et al. |
| 5,945,980 A | 8/1999 | Moissev et al. | | 6,867,896 B2 | 3/2005 | Miles |
| 5,986,796 A | 11/1999 | Miles | | 6,870,581 B2 | 3/2005 | Li et al. |
| 6,028,690 A | 2/2000 | Carter et al. | | 6,870,654 B2 | 3/2005 | Lin et al. |
| 6,038,056 A | 3/2000 | Florence et al. | | 6,882,458 B2 | 4/2005 | Lin et al. |
| 6,040,937 A | 3/2000 | Miles | | 6,882,461 B1 | 4/2005 | Tsai et al. |
| 6,049,317 A | 4/2000 | Thompson et al. | | 6,912,022 B2 | 6/2005 | Lin et al. |
| 6,055,090 A | 4/2000 | Miles | | 6,952,303 B2 | 10/2005 | Lin et al. |
| 6,061,075 A | 5/2000 | Nelson et al. | | 6,958,847 B2 | 10/2005 | Lin |
| 6,099,132 A | 8/2000 | Kaeriyama | | 2001/0003487 A1 | 6/2001 | Miles |
| 6,100,872 A | 8/2000 | Aratani et al. | | 2001/0050666 A1 | 12/2001 | Huang et al. |
| 6,113,239 A | 9/2000 | Sampsell et al. | | 2002/0012159 A1 | 1/2002 | Tew |
| 6,147,790 A | 11/2000 | Meier et al. | | 2002/0015215 A1 | 2/2002 | Miles |
| 6,160,833 A | 12/2000 | Floyd et al. | | 2002/0024711 A1 | 2/2002 | Miles |
| 6,180,428 B1 | 1/2001 | Peeters et al. | | 2002/0041264 A1 | 4/2002 | Quanrud |
| 6,201,633 B1 | 3/2001 | Peeters et al. | | 2002/0054424 A1 | 5/2002 | Miles |
| 6,222,511 B1 | 4/2001 | Stoller et al. | | 2002/0075555 A1 | 6/2002 | Miles |
| 6,232,936 B1 | 5/2001 | Gove et al. | | 2002/0126364 A1 | 9/2002 | Miles |
| 6,242,989 B1 | 6/2001 | Barber et al. | | 2002/0149828 A1 | 10/2002 | Miles |
| 6,243,149 B1 | 6/2001 | Swanson et al. | | 2002/0171610 A1 | 11/2002 | Siwinski et al. |
| 6,275,220 B1 | 8/2001 | Nitta | | 2002/0175284 A1 | 11/2002 | Vilain |
| 6,282,010 B1 | 8/2001 | Sulzbach et al. | | 2002/0181208 A1 | 12/2002 | Credelle et al. |
| 6,295,154 B1 | 9/2001 | Laor et al. | | 2002/0186209 A1 | 12/2002 | Cok |
| 6,304,297 B1 | 10/2001 | Swan | | 2003/0004272 A1 | 1/2003 | Power |
| 6,323,982 B1 | 11/2001 | Hornbeck | | 2003/0043157 A1 | 3/2003 | Miles |
| 6,339,417 B1 | 1/2002 | Quanrud | | 2003/0072070 A1 | 4/2003 | Miles |
| 6,395,863 B2 | 5/2002 | Geaghan | | 2003/0107805 A1 | 6/2003 | Street |
| 6,424,094 B1 | 7/2002 | Feldman | | 2003/0122773 A1 | 7/2003 | Washio |
| 6,447,126 B1 | 9/2002 | Hornbeck | | 2003/0128197 A1 | 7/2003 | Turner et al. |
| 6,465,355 B1 | 10/2002 | Horsley | | 2003/0141453 A1 | 7/2003 | Reed et al. |
| 6,466,354 B1 | 10/2002 | Gudeman | | 2003/0173504 A1 | 9/2003 | Cole et al. |
| 6,466,358 B2 | 10/2002 | Tew | | 2003/0202264 A1 | 10/2003 | Weber et al. |
| 6,473,072 B1 | 10/2002 | Comiskey et al. | | 2003/0202265 A1 | 10/2003 | Reboa et al. |
| 6,473,274 B1 | 10/2002 | Maimone et al. | | 2003/0202266 A1 | 10/2003 | Ring et al. |
| 6,480,177 B2 | 11/2002 | Doherty et al. | | 2005/0001828 A1 | 1/2005 | Martin et al. |
| 6,496,122 B2 | 12/2002 | Sampsell | | 2005/0002082 A1 | 1/2005 | Miles |
| 6,545,335 B1 | 4/2003 | Chua et al. | | 2005/0003667 A1 | 1/2005 | Lin et al. |
| 6,548,908 B2 | 4/2003 | Chua et al. | | 2005/0017177 A1 | 1/2005 | Tai et al. |
| 6,549,195 B2 | 4/2003 | Hikida et al. | | 2005/0017942 A1 | 1/2005 | Tsujino et al. |
| 6,549,338 B1 | 4/2003 | Wolverton et al. | | 2005/0024557 A1 | 2/2005 | Lin |
| 6,552,840 B2 | 4/2003 | Knipe | | 2005/0035699 A1 | 2/2005 | Tsai |
| 6,574,033 B1 | 6/2003 | Chui et al. | | 2005/0036095 A1 | 2/2005 | Yeh et al. |
| 6,589,625 B1 | 7/2003 | Kothari et al. | | 2005/0036192 A1 | 2/2005 | Lin et al. |
| 6,600,201 B2 | 7/2003 | Hartwell et al. | | 2005/0038950 A1 | 2/2005 | Adelmann |

| | | | |
|---|---|---|---|
| 2005/0042117 A1 | 2/2005 | Lin | |
| 2005/0046922 A1 | 3/2005 | Lin et al. | |
| 2005/0046948 A1 | 3/2005 | Lin | |
| 2005/0057442 A1 | 3/2005 | Way | |
| 2005/0068583 A1 | 3/2005 | Gutkowski et al. | |
| 2005/0068605 A1 | 3/2005 | Tsai | |
| 2005/0068606 A1 | 3/2005 | Tsai | |
| 2005/0069209 A1 | 3/2005 | Damera-Venkata et al. | |
| 2005/0078348 A1 | 4/2005 | Lin | |
| 2005/0168849 A1 | 8/2005 | Lin | |
| 2005/0195462 A1 | 9/2005 | Lin | |
| 2005/0202649 A1 | 9/2005 | Hung et al. | |
| 2006/0250337 A1* | 11/2006 | Miles | 345/85 |

FOREIGN PATENT DOCUMENTS

| | | |
|---|---|---|
| EP | 0608056 A1 | 7/1994 |
| EP | 0667548 | 8/1995 |
| EP | 0986077 A2 | 3/2000 |
| EP | 1067805 A2 | 1/2001 |
| JP | 3109524 A | 5/1991 |
| JP | 405275401 | 10/1993 |
| JP | 10161630 A | 6/1998 |
| RO | 157313 | 5/1991 |
| WO | WO 94/29840 A1 | 12/1994 |
| WO | WO 95/30924 | 11/1995 |
| WO | WO 97/17628 | 5/1997 |
| WO | WO 99/52006 A2 | 10/1999 |
| WO | WO 99/52006 A3 | 10/1999 |
| WO | WO 02/063602 A1 | 8/2002 |
| WO | WO 03/007049 A1 | 1/2003 |
| WO | WO 03/069413 A1 | 8/2003 |
| WO | WO 03/073151 A1 | 9/2003 |
| WO | WO 2004/006003 A1 | 1/2004 |
| WO | WO 2004/026757 A2 | 4/2004 |
| WO | WO 2004/075526 A2 | 9/2004 |

OTHER PUBLICATIONS

Ibotson, et al. "Comparison of XeF2, and F-atom reactions with Si and Si02, Applied Physics Letters." vol. 44, No. 12, Jun. 1984. pp. 1129-1131.

Schnakenberg, et al. "THAHW Etchants for Silicon Micromachining." 1991 International Conference on Solid State Sensors and Actuators—Digest of Technical Papers. pp. 815-818.

Williams, et al. Etch Rates for Michromachining Processing—Journal of Microelectromechanical Systems. vol. 5 No. 4, Dec. 1996, pp. 256-269.

Winters, et al., "The Etching of Silicon with XeF2 Vapor." Applied Physics Letters, vol. 34. No. 1, Jan. 1979, pp. 70-73.

Austrian Search Report from U.S. Appl. No. 11/097,509, Jul. 14, 2005.

Austrian Search Report from U.S. Appl. No. 11/097,509, Jul. 29, 2005.

Austrian Search Report from U.S. Appl. No. 11/096,546, May 19, 2005.

Austrian Search Report from U.S. Appl. No. 11/140,560, Aug. 11, 2005.

Austrian Search Report from U.S. Appl. No. 11/066,724, May 13, 2005.

Austrian Search Report from U.S. Appl. No. 11/097,818, Jul. 14, 2005.

Austrian Search Report from U.S. Appl. No. 11/097,820, Jun. 29, 2005.

Akasaka, "Three-Dimensional IC Trends," Proceedings of IEEE, vol. 74, No. 12, pp. 1703-1714 (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface Micromachined Tuneable Interferometer Array," Sensors and Actuators, pp. 17-23 (1994).

Billard, C.; "Tunable Capacitor," 5h Annual Review of LETI, Jun. 24, 2003, p. 7.

Bouchaud, Jeremie; Wicht, Henning; "RF MEMES Analysis, Forecasts and Technology Review," Chip Unaxis, date unknown, [online] retrieved from the Internet: <URL:http://semiconductors.unaxis.com/en/download/RF%20MEMS.pdf>.

Chan et al., "Low-Actuation Voltage RF MEMS Shunt Switch With Cold Switching Lifetime of Seven Billion Cycles," Journal of Microelectromechanical Systems vol. 12, No. 5 (Oct. 2003).

Conner, "Hybrid Color Display Using Optical Interference Filter Array," SID Digest, pp. 577-580 (1993).

De Coster et al., "Variable RF MEMS Capacitors With Extended Tuning Range", IEEE International Solid-State Sensors and Actuators Conference, Boston, (Jun. 8-12, 2003).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters (Sep. 1994).

Gosch, "West Germany Grabs the Lead in X-Ray Lithography," Electronics, pp. 78-80 (Feb. 5, 1987).

Heines et al, "Bi-Stable Flat-Panel Display Based on a 180 [Deg.] Flipping Pixel", Conference: Displays IX: Displays for Defense Applications, (Apr. 2-5, 2002), Proceedings of the SPIE: The International Society for Optical Engineering, vol. 4712. pp. 327-335.

Howard et al., "Nanometer-Scale Fabrication Techniques," VLSI Electronics: Microstructure Science, vol. 5, pp. 145-153 and pp. 166-173 (1982).

Jackson, "Classical Electrodynamics," John Wiley & Sons Inc., pp. 568-573, date unknown.

Jerman et al., "A Miniature Fabry-Perot Interferometer with a Corrugated Silicon Diaphragm Support," IEEE Electron Devices Society (1988).

Johnson "Optical Scanners," Microwave Scanning Antennas, vol. 1, pp. 251-261 (1964).

Li, G.P. "On the design and Fabrication of Electrostatic RF MEMS Switches," Final Report 1990-00 for MICRO Project 99-071, University of California, Irvine.

Light over Matter, Circle No. 36 (Jun. 1993).

Mait, "Design of Diffractive Optical Elements for Optical Signal Processing", IEEE Lasers and Electro-Optics Society Annual Meeting, pp. 59-60, (Nov. 15-18, 1993).

Miles, "A New Reflective FPD Technology Using Interferometric Modulation," Society for Information Display '97 Digest, Session 7.3.

Newsbreaks, "Quantum-trench devices might operate at terahertz frequencies," Laser Focus World (May 1993).

Nieminen, Heikki, Ermolov, Vladimir; Silanto, Samuli; Nybergh, Kjell; Rhanen, Tapani; "Design of a Temperature-Stable RF MEM Capacitor," Institute of Electrical and Electronics Engineers (IEEE) Journal of Microelectromechanical Systems, vol. 13, No. 5, Oct. 2004, pp. 705-714.

Oliner et al., "Radiating Elements and Mutual Coupling," Microwave Scanning Antennas, vol. 2, p. 131-194 (1966).

Oz et al., "CMOS-Compatible RF-MEMS Tunable Capacitors", IEEE MTT-S International Microwave Symposium—IMS 2003, (Jun. 8-13, 2003).

Pacheco et al. "Design of Low Actuation Voltage RF MEMS Switch" Radiation Laboratory and Center for Microsystems Department of Electrical Engineering and Computer Science University of Michigan, IEEE (2000) 0-7803-5687-X/00/.

Raley et al., "A Fabry-Perot Microinterferometer for Visible Wavelengths," IEEE Solid-State Sensor and Actuator Workshop, Hilton Head, SC (1992).

Solgaard et al., "Interference-Based Optical MEMS Filters", Optical 2004 Fiber Communication Conference, vol. 1, (Feb. 23-27, 2004).

Sperger et al., "High Performance Patterned All-Dielectric Interference Colour Filter for Display Applications," SID Digest, pp. 81-83 (1994).

Stone, "Radiation and Optics, An Introduction to the Classical Theory," McGraw-Hill, pp. 340-343 (1963).

Tan et al. "RF MEMS Simulation-High Isolation CPW Shunt Switches", Ansoft: Global Seminars: Delivering Performance (2003).

Vähä-Heikkilä et al. "Design of Capacitive RF MEMS Power Sensor" VTT Information Technology, (2002), available at <http://www.hut.fi/Units/Radio/URSI02/ursi_vaha-heikkila.pdf>.

Walker, et al., "Electron-beam-tunable Interference Filter Spatial Light Modulator," Optics Letters vol. 13, No. 5, pp. 345-347 (May 1988).

Wang et al., "Design and Fabrication of a Novel Two-Dimension MEMS-Based Tunable Capacitor", IEEE 2002 International Conference on Communications, Circuits and Systems and West Sino Expositions, vol. 2, pp. 1766-1769, (Jun. 29-Jul. 1, 2002).

Winton, John M., "A novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

\* cited by examiner

SYSTEM AND METHOD OF IMPLEMENTATION OF INTERFEROMETRIC MODULATORS FOR DISPLAY MIRRORS

CROSS REFERENCE TO RELATED APPLICATIONS

This application claims priority to U.S. Provisional Application No. 60/613,298, titled "System and Method for Implementation of Interferometric Modulator Displays," filed Sep. 27, 2004, which is incorporated by reference, in its entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment comprises a device with a substrate, and an array of reflective elements arranged on the substrate to form a mirror surface that specularly reflects incident light in at least one wavelength band, each element comprising a partially reflective layer, and a substantially reflective layer separated from the partially reflective layer by a predetermined space, wherein the space defines an interferometric cavity wherein one or more of the elements are configured to be selectably reflective; and wherein one or more of the elements are configured to be permanently reflective.

Another embodiment provides a vehicle comprising a steering mechanism, and a mirror configured to be positioned such that light coming from behind the vehicle is reflected to a location for an operator to see when positioned to use the steering mechanism, the mirror comprising a substrate, and an array of reflective elements arranged on the substrate to form a mirror surface that specularly reflects incident light in at least one wavelength band, each element comprising a partially reflective layer, and a substantially reflective layer separated from the partially reflective layer by a predetermined space, wherein the space defines an interferometric cavity.

Still another embodiment provides a device comprising a mirror comprising a substrate, and an array of reflective elements arranged on the substrate to form a mirror surface that specularly reflects incident light in at least one wavelength band, each element comprising a partially reflective layer, and a substantially reflective layer separated from the partially reflective layer by a predetermined space, wherein the space defines an interferometric cavity and the wavelength band of light reflected from the element is based on a dimension of the cavity, and a mount configured to attach the mirror to a vehicle, a wall, an article of furniture, an ornamental object, an article of clothing, or a person.

Still another embodiment provides a device, comprising means for supporting; and means for specularly reflecting incident light in at least one wavelength band and being formed on the supporting means, wherein a first portion of the reflecting means is selectably reflective and a second portion of the reflecting means is permanently reflective.

Still another embodiment provides a method of using a device comprising a mirror comprising a substrate; and an array of reflective elements arranged on the substrate to form a mirror surface that specularly reflects incident light in at least one wavelength band, each element comprising: a partially reflective layer; and a substantially reflective layer separated from the partially reflective layer by a predetermined space, wherein the space defines an interferometric cavity and the wavelength band of light reflected from the element is based on a dimension of the cavity; and a mount configured to attach the mirror to a vehicle, a wall, an article of furniture, an ornamental object, an article of clothing, or a person, the method comprising establishing a communication link between the device and an information source, receiving data from the source, and displaying the data on the array.

Another embodiment provides a method of manufacturing a device comprising forming a substrate, and fashioning an array of reflective elements arranged on the substrate to form a mirror surface that specularly reflects incident light in at least one wavelength band, each element comprising: a partially reflective layer, a substantially reflective layer separated from the partially reflective layer by a predetermined space, wherein the space defines an interferometric cavity, wherein one or more of the elements are configured to be selectably reflective, and wherein one or more of the elements are configured to be permanently reflective.

Another embodiment provides a device manufactured by a process comprising: forming a substrate, and fashioning an array of reflective elements arranged on the substrate to form a mirror surface that specularly reflects incident light in at least one wavelength band, each element comprising: a partially reflective layer, a substantially reflective layer separated from the partially reflective layer by a predetermined space, wherein the space defines an interferometric cavity, wherein one or more of the elements are configured to be selectably reflective, and wherein one or more of the elements are configured to be permanently reflective.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One interferometric modulator display embodiment comprises an array of MEMS display elements, at least a portion of which are substantially specular, and at least a portion of which are selectably reflective. The portion of the display which is specular may be used as a mirror, and the selectably reflective portion may be used to display information. This allows for information to be displayed on the device while it is simultaneously being used as a mirror, for example, while driving, combing one's hair or applying make-up.

Figure 1:
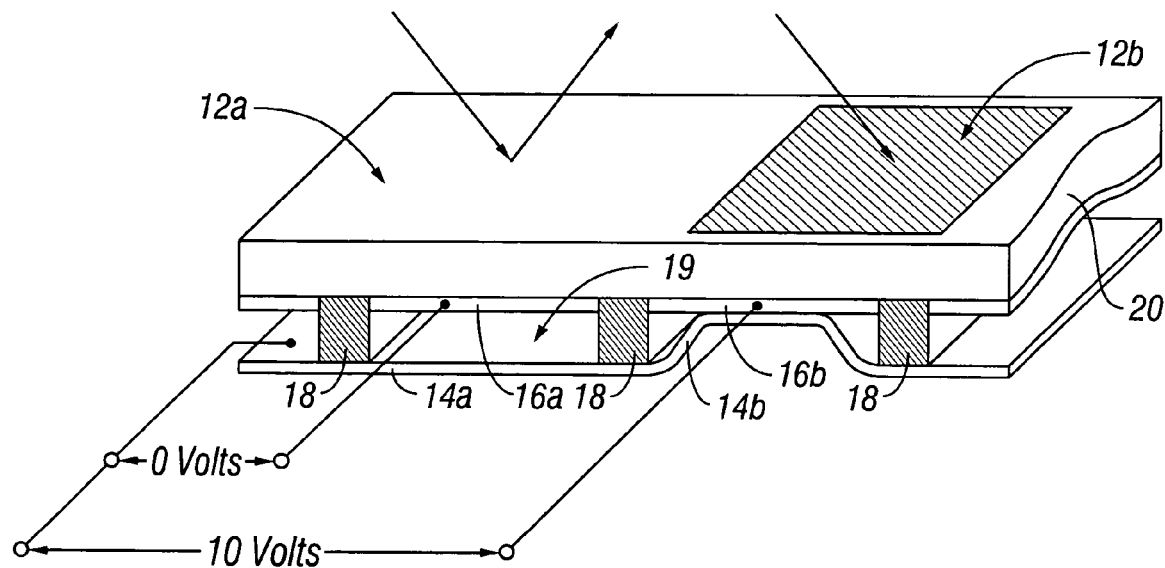
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
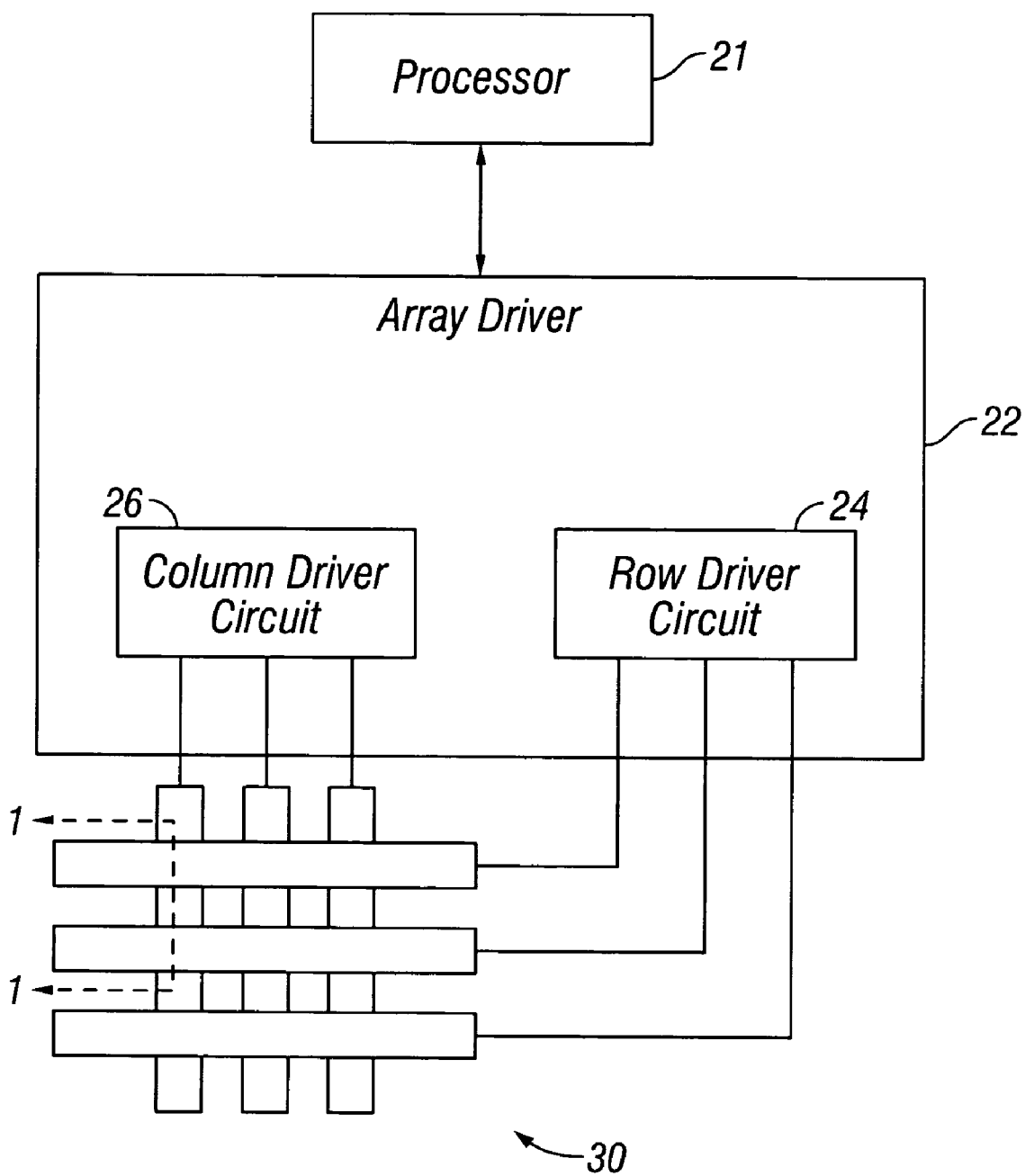
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
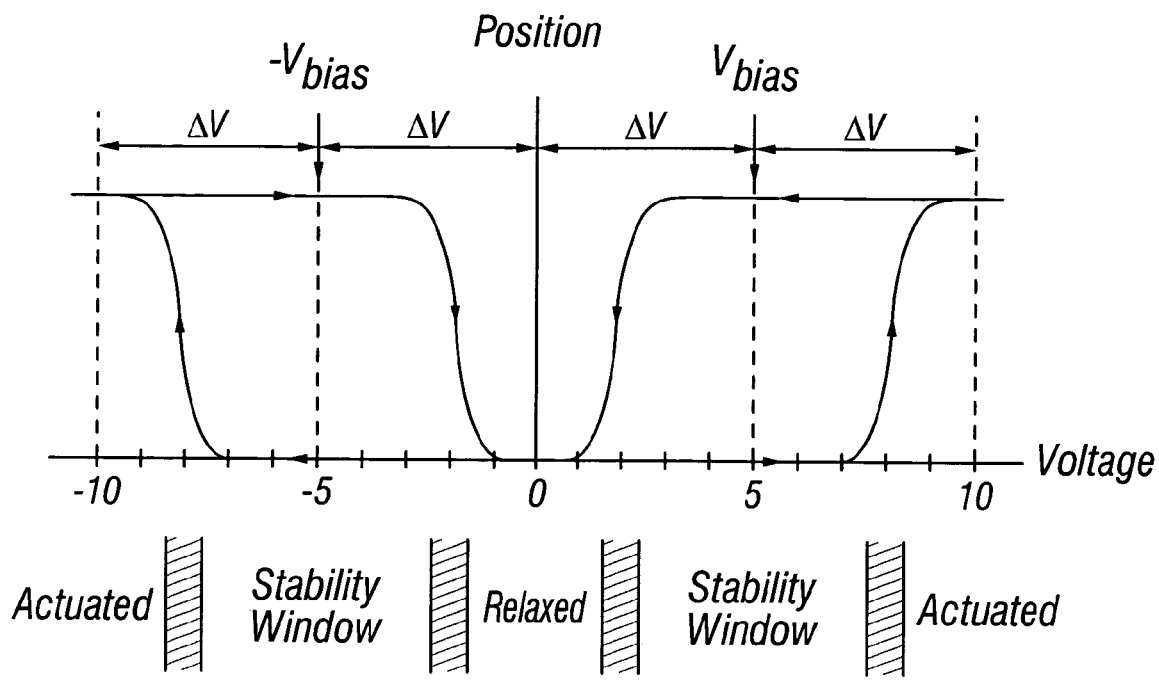
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
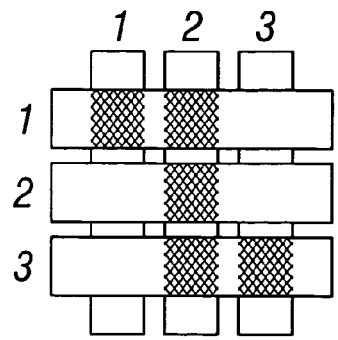
FIGS. 5A and 5B illustrate one exemplary timing diagram for row and column signals that may be used to write a frame of display data to the 3×3 interferometric modulator display of FIG. 2.
Figure 5B:
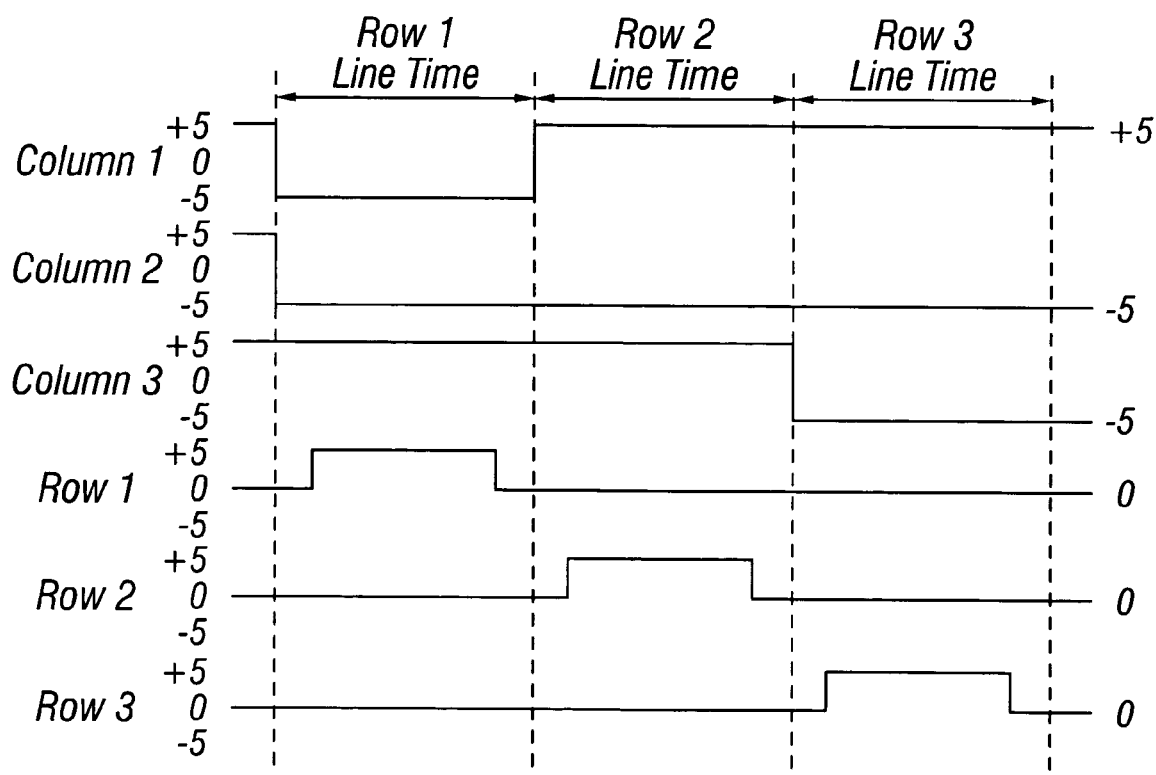

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time"

for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
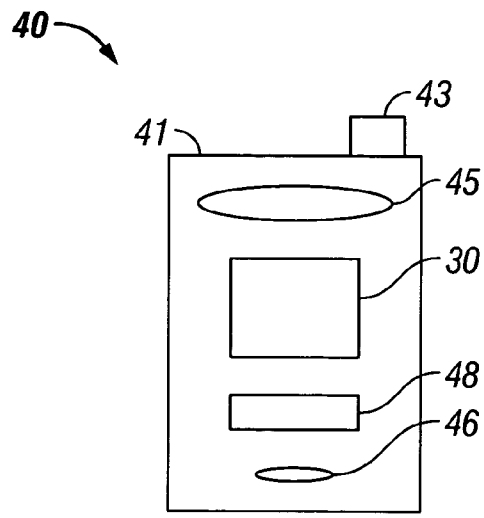
FIGS. 6A and 6B are system block diagrams illustrating an embodiment of a visual display device comprising a plurality of interferometric modulators.
Figure 6B:
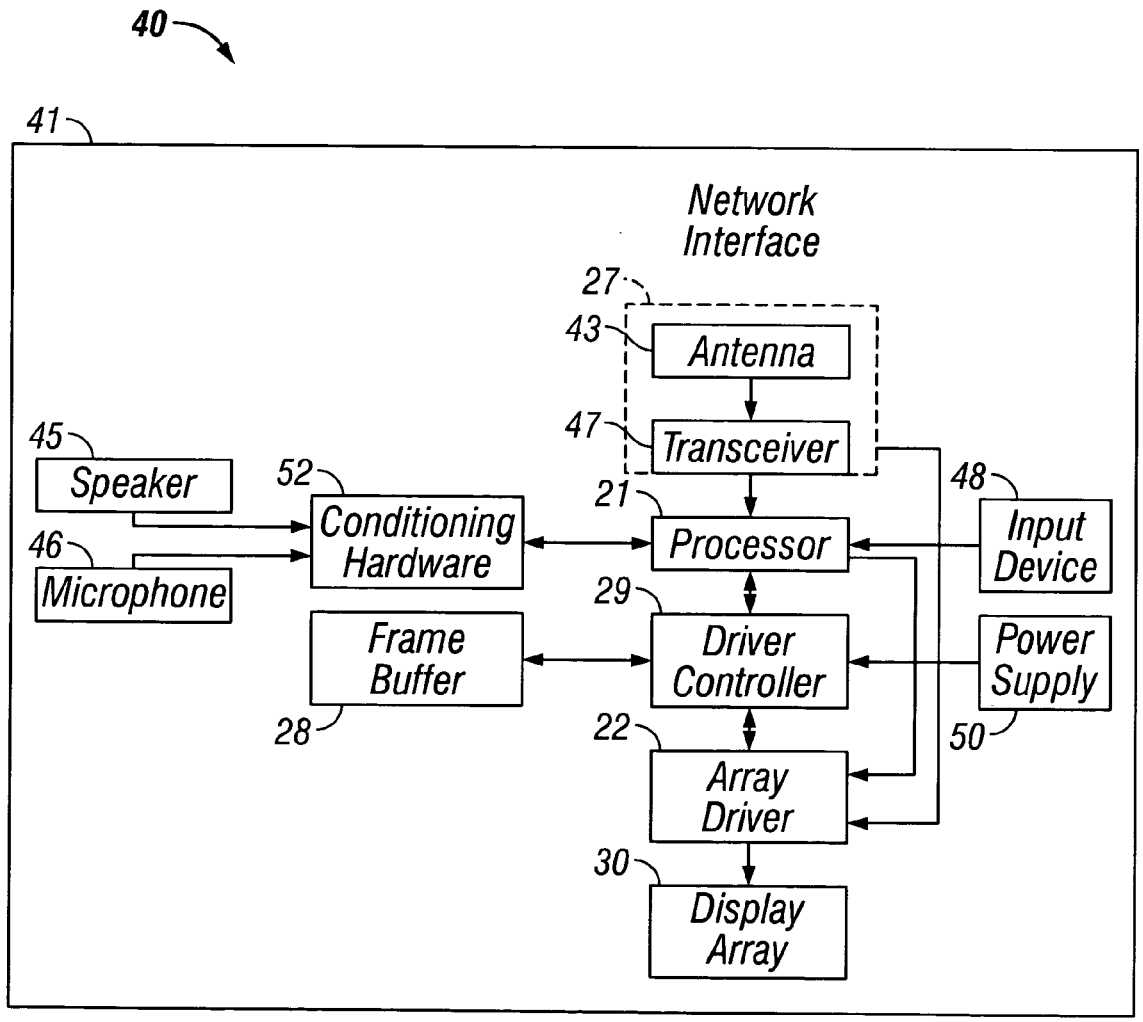

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11 (a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
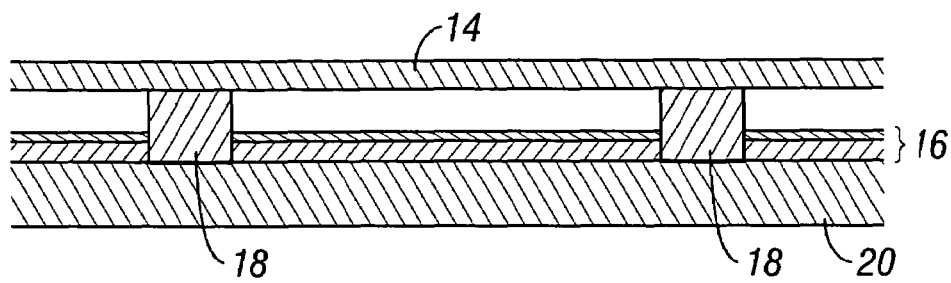
FIG. 7A is a cross section of the device of FIG. 1.
Figure 7B:
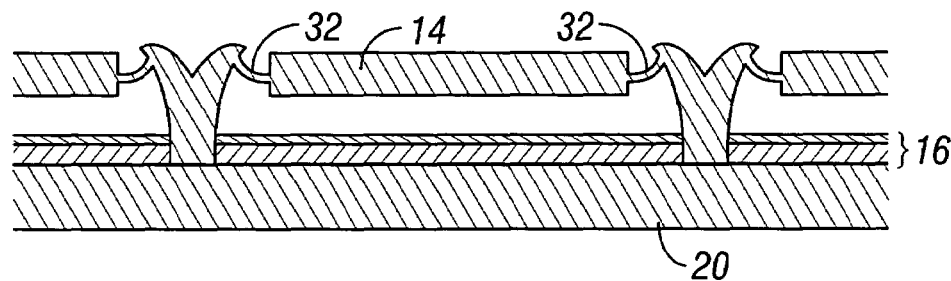
FIG. 7B is a cross section of an alternative embodiment of an interferometric modulator.
Figure 7C:
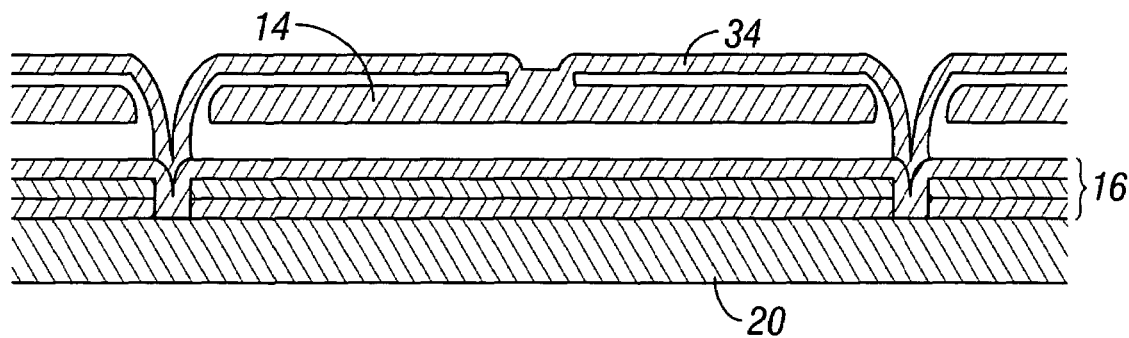
FIG. 7C is a cross section of another alternative embodiment of an interferometric modulator.
Figure 7D:
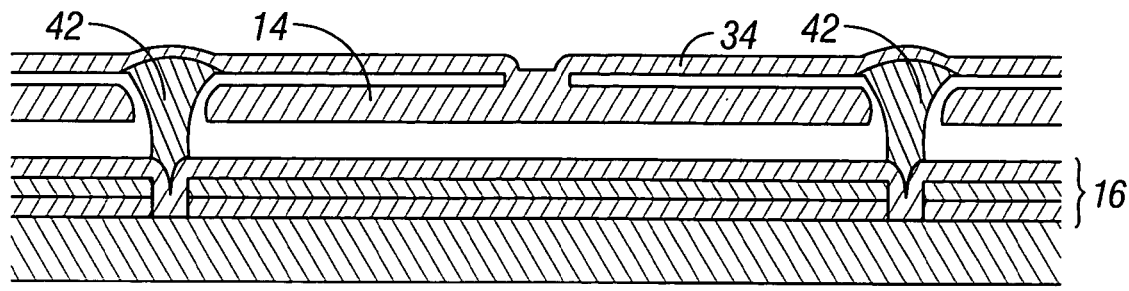
FIG. 7D is a cross section of yet another alternative embodiment of an interferometric modulator.
Figure 7E:
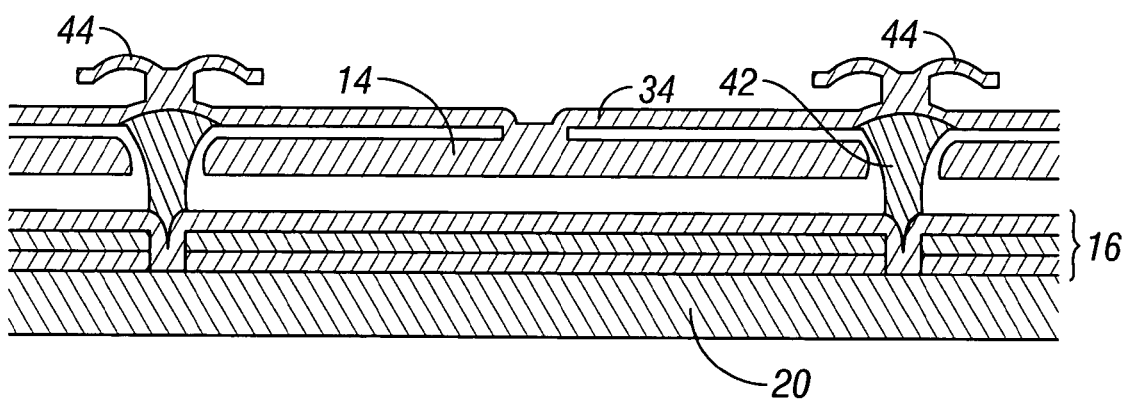
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
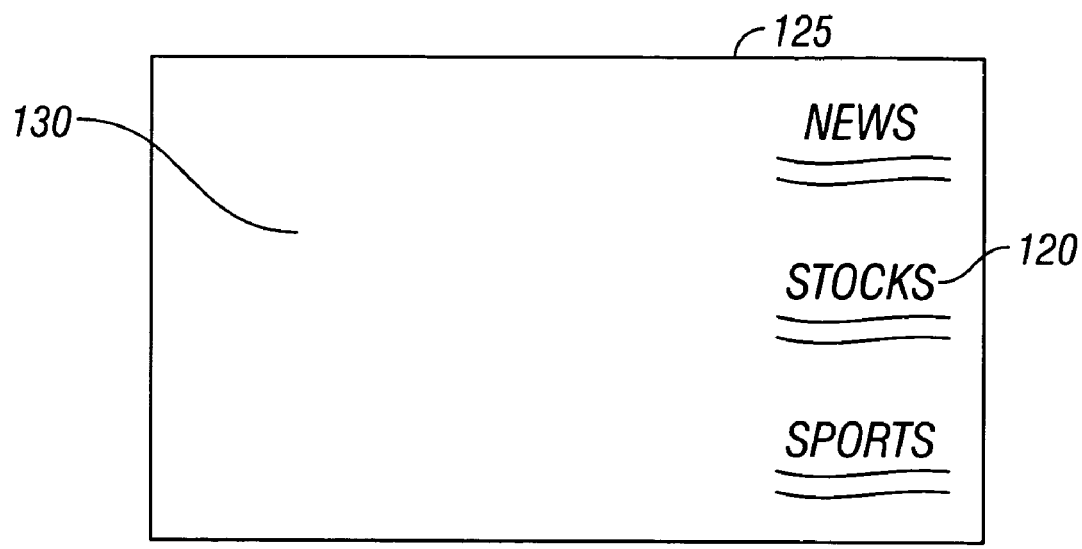
FIG. 8 is a front view of an interferometric device configured as a specular reflective display that can provide information to a viewer.

FIG. 8 shows an embodiment of a display device 125 comprising an array of interferometric modulators configured to perform substantially as a specular mirror in addition to displaying information. At least a portion of the array may be configured to be specular, e.g., mirror-like, instead of diff-use as is the case for many embodiments of interferometric modulators. Generally an interferometric modulator is a specular device. In one modulator embodiment the interferometric modulator appears diffuse only if a diffusion material is used to modify the incident and reflected light. When a diffusion material is not used the array appears substantially specular. The reflective layer within the interferometric modulator is substantially specular and the interferometric properties of the cavity and the optical stack may be configured so that the entire interferometric modulator is also specular. At least a portion of the array may be configured to be white (e.g. reflective of light across the visible spectrum), instead of colored (e.g. reflective of light within a narrow or wide band of visible wavelengths or reflective of light within multiple narrow or wide bands of visible wavelengths, but not across the entire visible spectrum), as is the case for many embodiments of interferometric modulators. In addition to being substantially specular, the reflective layer within the interferometric modulator is also substantially white, and the interferometric properties of the cavity and the optical stack may be configured so that the entire interferometric modulator is also white. Techniques for accomplishing whiteness and specularity include, but are not limited to those briefly discussed herein. In general, if the optical stack is sufficiently thin, it will not significantly alter the whiteness of the device. Specifics will depend at least on materials used. Some embodiments of interferometric modulators with thin optical stacks have the electronic control and the mechanical structure on opposite side of the deflectable mirror than the optical stack. This allows the thickness of the optical stack to be controlled independent of constraints incurred when the electrode is embedded within the optical stack. Another option to whiten the device is to create the interferometric cavities with gaps large enough to allow multiple frequencies of light to constructively interfere.

In some embodiments at least a portion of the display device 125 may be configured to display information. The interferometric modulators in such a portion can be configured to selectably change between at least two optical states according to an input, as described above. The optical characteristics of the at least two states differ enough so that a contrast between the states can be perceived by a viewer. When the optical characteristics of individual interferometric modulators are properly selected, the information can be displayed. The optical characteristics which may be selectably altered include reflectivity, and color. For example, to display information certain interferometric modulators may be selected to have higher reflectivity than other interferometric modulators, or certain interferometric modulators may be selected to have blue color and others green color, where the difference between the higher and lower reflectivity, and the blue and green color is at least enough to be perceived by a viewer. Combinations of optical characteristics may be used. For example, combinations of colors and reflectivity may be altered to create perceptible contrast. Other contrasting optical characteristic states are possible and are not disfavored. Thus, the ability to selectably alter the interferometric modulators contrasting optical states allows for text or an image to be displayed.

In some embodiments at least a portion of the display portion 120 may be configured to change between first and second optical states, while a second portion may be configured to change between third and fourth optical states. In some embodiments these portions are continuous and large enough to be seen by a viewer as being distinct areas where the each area is perceived as having a distinct optical characteristic. For example, a region may have the shape of a sun, and the interferometric modulators in the region may have a color characteristic of reflecting yellow light. Some of the interferometric modulators in the region may also selectably change between reflecting yellow light and reflecting white light. The selectably changeable interferometric modulators may be used to, for example, display a current temperature.

In some embodiments the interferometric modulators may operate over a range of optical states, such as a continuous range of colors or grey-scale or reflectivity. The display portion 120 may also be a color display wherein each pixel can selectively display a range of colors. The display portion 120 may also display in a grey scale mode where the interferometric modulators are configured to be white, and how much reflectivity in each pixel varies according to the information to be displayed. The display device 125 may have various display portions 120 which may each have different operating configurations as described above. In some embodiments the operating configuration of the display portions may change.

As discussed above, in some embodiments the information is displayed by the contrast of two optical states both being reflective. In such embodiments it should be noted that the display portion 120 in addition to displaying information is specularly reflective and will still function as a mirror. For example if a portion of the display portion is displaying information using interferometric modulators configured to change between orange and green reflective states that portion of the display device 125 will still show the image of objects seen in the mirror. The objects, however, will appear as if they are orange and/or green.

In some embodiments the display portion 120 may have interferometric modulators which are formed in a specific shape corresponding to the information or a portion of the information to be displayed. For example the display portion 120 may have an interferometric modulator in the shape of a vehicle with a door open. Such an interferometric modulator may be used on a rear-view mirror in a vehicle. A door not being completely closed may be indicated by actuating the interferometric modulator such as to have a contrasting appearance to the immediately surrounding area of the mirror. Some interferometric modulators may be in the shape of numeral segments, so as to be configured to, in combination, display various numerals.

In some embodiments a diffusion material is applied to at least a portion of the array to render that portion of the display more diffuse than other portions. For example, one or more portions of the device may be dedicated as display-only portions, where better display appearance may be attained with a diffusion material.

Alternatively, one or more portions may be dedicated as mirror-only portions. In mirror-only portions the interferometric modulators may be configured to be in a single non-selectable state of having white color as perceived by a viewer and/or having high reflectivity (i.e. being reflective enough to effectively useable as a mirror). The regions between interferometric modulators may also be configured to have high reflectivity. In some embodiments the mirror-only portions may comprise reflective layers only and may not comprise interferometric modulators. In some embodiments the mirror-only portion may have optical stack properties customized for high reflectivity.

Referring to FIG. 8, a mirror surface 130 of a display device 125 may be used for any purpose for which mirrors are used, such as shaving or applying makeup. Simultaneously, a display portion 120 of the display device 125 may be used to provide information to a viewer. The display portion 120 may be of any shape, may be located at any position of the display device 125, and may be moved from position to position. Such manipulation of the display portion 120 may be controlled, for example dynamically by user input, or through programming, or another external device. Although shown in FIG. 8 as being rectangular the display device 125 may be of arbitrary shape.

The information may include any type of desired information including but not limited to news, stock quotations, sports scores etc. For example, while combing ones hair, information about the weather forecast may be displayed to help in deciding what clothing to wear for the day. The information may be communicated to the display device 125 from an external source, such as, but not limited to a telecommunications or display device over a wired or wireless connection. For example, the display device 125 may comprise or have a wired or wireless connection to a device with a television tuner, and the display may show the morning news or a sporting event. The display device 125 may also comprise or have an electrical connection to a PC, or a device for displaying video images, such as a video player, or a DVD player. In some embodiments the PC may be connected to an internet site showing live images of, for example, traffic conditions or a place of interest in natural setting such as a waterfall.

One or more aspects of the information may be programmable. The display device 125 may, for example, sequentially display current outside temperature, expected high temperature and expected low temperature for the day. The user may program the display device 125 to display one or more types of information from a set of optional information types, such as sports scores, news headlines, or driving conditions. The information may be primarily aesthetic, such as an ornamental design or a picture of ones family. The information may be user defined, such as a "to do" list, or a reminder of a friends birthday. The display device 125 may be configured to have various modes of operation from which the user chooses. For example, the user may select a mode to display aesthetic images or to display traffic information or to display combinations of information types.

The user programmability may be managed in various ways. There may be a wireless or wired connection to a PC with software to program the display device 125. The display device 125 may comprise local processing capabilities with software to enable the user to interface graphically with the associated programming software. There may be an interface for the user to connect a keyboard and/or a mouse to the display device 125 at least for programming. In some embodiments the display device 125 may comprise touch screen technology, which may at least be used for programming. In some embodiments the display device 125 may comprise buttons and/or knobs for programming and/or for controlling display characteristics, such as location or brightness.

Figure 9:
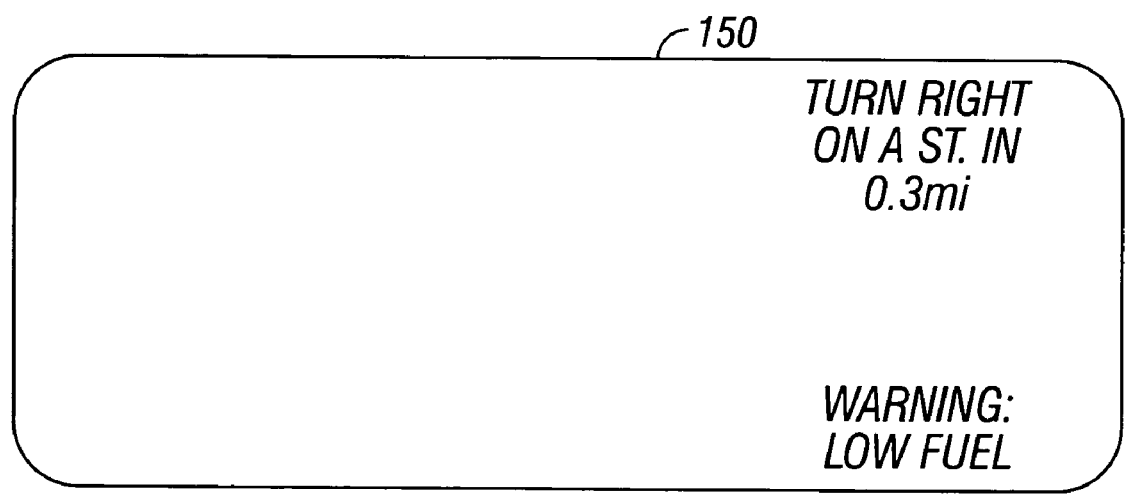
FIG. 9 is a front view of a rear-view mirror embodiment.

In some embodiments, the display device 125 is configured as a rear-view or side mirror on a vehicle. Such an embodiment is shown as rear-view mirror 150 in FIG. 9. Using interferometric modulator technology, the mirror can display information to the driver. The information may include environmental information, such as temperature, wind speed and wind direction. Location data, such as position, speed, and direction of travel may also be shown. Route information may be given, such as a map, turn by turn driving directions, and direction of and distance to the next turn. Vehicle status data, such as speed, temperature, engine RPM, the distance to objects behind the car, an image of what is behind the car may also be displayed. Radio information, such as volume, channel, CD title, song title, and program title may also be displayed. Various warnings, such as low fuel, high speed, high engine temperature, passenger without a seatbelt, low tire pressure, and external object proximity. Various sensors throughout the vehicle may be configured to communicate to the display device 125 to provide the information to be displayed. The information may also be communicated from external sources using wireless connections.

The mirror may also be configured with a mount to attach the mirror to a vehicle, a wall, an article of furniture, an ornamental object, an article of clothing, or a person.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A mirror, comprising:
    a substrate; and
    an array of reflective elements configured to specularly reflect incident light so as to portray a reflected image, each element comprising:
        a partially reflective layer; and
        a substantially reflective layer separated from the partially reflective layer by a predetermined space, wherein the space defines an interferometric cavity; wherein one or more of the elements are configured to be selectably reflective.

2. The mirror of claim 1, wherein one or more of the selectably reflective elements is configured to selectably be in one of first and second optical states.

3. The mirror of claim 2, wherein the first optical state differs from second optical state in at least one of reflectivity and color so that the contrast between the two states is perceptible to a viewer.

4. The mirror of claim 1, wherein one or more of the elements are configured to be in a single non-selectable state of being highly reflective.

5. The mirror of claim 4, wherein at least a portion of the area between the elements configured to be in a single non-selectable state of high reflectivity is configured to be specularly reflective.

6. The mirror of claim 1, wherein at least a portion of the reflective surface of the mirror comprises a highly reflective layer configured to reflect non-interferometrically.

7. The mirror of claim 1, wherein at least one of the reflective elements of the array is formed in a shape corresponding to at least a portion of information to be displayed by the at least one element.

8. The mirror of claim 1, wherein at least a portion of the area between the elements of the array is configured to be specularly reflective.

9. The mirror of claim 1, wherein at least a first portion of the array comprises adjacent elements configured to be perceived by a viewer as having an optical characteristic different from an optical characteristic of another portion of the array.

10. The mirror of claim 1, wherein at least at least one of the selectably reflective elements is configured to be perceived as:
    displaying information; and
    being highly reflective.

11. The mirror of claim 1, wherein the optical characteristics of one or more of the elements is based upon at least one of input from an external source, user input, and programming.

12. The mirror of claim 1, wherein one or more of the elements are configured to be reflective across the visible spectrum.

13. The mirror of claim 1, wherein one or more of the elements are configured to reflect light substantially of a different wavelength band than one or more other elements.

14. The mirror of claim 1, further comprising:
    a processor that is in electrical communication with the array, the processor being configured to process image data; and
    a memory device in electrical communication with the processor.

15. The mirror of claim 14, further comprising a driver circuit configured to send at least one signal to the array.

16. The mirror of claim 15, further comprising a controller configured to send at least a portion of the image data to the driver circuit.

17. The mirror of claim 14, further comprising an image source module configured to send the image data to the processor.

18. The mirror of claim 17, wherein the image source module comprises at least one of a receiver, transceiver, and transmitter.

19. The mirror of claim 14, further comprising an input mirror configured to receive input data and to communicate the input data to the processor.

20. The mirror of claim 1, wherein the array is further configured to display an image according to received data.

21. The mirror of claim 20, wherein the mirror is further configured to function as a display in at least one of a cell phone, a computer, and a personal digital assistant.

22. A vehicle comprising:
a steering mechanism; and
a mirror configured to be positioned such that light coming from behind the vehicle is reflected to a location for an operator to see when positioned to use the steering mechanism, the mirror comprising:
a substrate; and
an array of reflective elements configured to specularly reflect incident light so as to portray a reflected image, each element comprising:
a partially reflective layer; and
a substantially reflective layer separated from the partially reflective layer by a predetermined space, wherein the space defines an interferometric cavity.

23. The vehicle of claim 22, wherein the mirror is configured to display warnings, radio information, vehicle status data, route information, location data, or environmental information.

24. The vehicle of claim 22, wherein one or more of the reflective elements is configured to selectably be in one of first and second optical states.

25. The vehicle of claim 22, wherein one or more of the reflective elements are configured to be in a single non-selectable state of being highly reflective.

26. The vehicle of claim 22, wherein at least a portion of the reflective surface of the mirror comprises a highly reflective layer configured to reflect non-interferometrically.

27. The vehicle of claim 22, wherein at least one of the reflective elements is formed in a shape corresponding to at least a portion of the information to be displayed by the at least one element.

28. The vehicle of claim 22, wherein the optical characteristics of one or more of the reflective elements is based upon at least one of input from an external source, user input, and programming.

29. The mirror of claim 22, wherein the array is further configured to display an image according to received data.

30. The mirror of claim 29, wherein the mirror is further configured to function as a display in at least one of a cell phone, a computer, and a personal digital assistant.

31. A device comprising:
a mirror comprising:
a substrate; and
an array of reflective elements configured to specularly reflect incident light so as to portray a reflected image, each element comprising:
a partially reflective layer; and
a substantially reflective layer separated from the partially reflective layer by a predetermined space, wherein the space defines an interferometric cavity and the wavelength band of light reflected from the element is based on a dimension of the cavity; and
a mount configured to attach the mirror to a vehicle, a wall, an article of furniture, an ornamental object, an article of clothing, or a person.

32. The device of claim 31, wherein one or more of the elements are configured to be in a single non-selectable state of being highly reflective.

33. The device of claim 31, wherein at least a first portion of the array comprises adjacent elements configured to be perceived by a viewer as displaying an optical characteristic different from an optical characteristic displayed by another portion of the array.

34. The device of claim 31, wherein optical characteristics of one or more of the elements is based upon at least one of input from an external source, user input, and programming.

35. The device of claim 31, wherein one or more of the elements are configured to be reflective across the visible spectrum.

36. The device of claim 31, wherein one or more of the elements are configured to reflect light substantially of a different wavelength band than one or more other elements.

37. The mirror of claim 31, wherein the array is further configured to display an image according to received data.

38. The mirror of claim 37, wherein the mirror is further configured to function as a display in an electronic device.

39. The mirror of claim 37, wherein the mirror is further configured to function as a display in at least one of a cell phone, a computer, and a personal digital assistant.

40. A mirror device, comprising:
means for interferometrically and specularly reflecting incident light in at least one wavelength band; and
means for selectably and interferometrically reflecting incident light in at least one wavelength band,
wherein the interferometrically and specularly reflecting means and the selectably and interferometrically reflecting means are cooperatively configured to specularly reflect incident light so as to portray a reflected image.

41. The device of claim 40 wherein the interferometrically and specularly reflecting means and the selectably and interferometrically reflecting means each comprise an array of reflective elements arranged to form a mirror surface that specularly reflects incident light in at least one wavelength band, each element comprising:
a partially reflective layer; and
a substantially reflective layer separated from the partially reflective layer by a predetermined space, wherein the space defines an interferometric cavity.

42. The device of claim 40, further comprising means for selecting the optical characteristics of a portion of the selectably and interferometrically reflecting means based upon at least one of input from an external source, user input, and programming.

43. The device of claim 42, wherein the selecting means for selecting comprises a driving circuit.

44. The device of claim 40, wherein a first portion of the selectably and interferometrically reflecting means is configured to reflect light substantially of a different wavelength band than a second portion of the selectably reflecting means.

45. The mirror of claim 40, wherein the array is further configured to display an image according to received data.

46. A method of using a display device comprising:
establishing a communication link between the device and an information source, the device comprising a mirror comprising a substrate; and an array of reflective elements configured to specularly reflect incident light so as to portray a reflected image, each element comprising: a partially reflective layer; and a substantially reflective layer separated from the partially reflective layer by a predetermined space, wherein the space defines an interferometric cavity and the wavelength band of light reflected from the element is based on a dimension of the cavity; and a mount configured to attach the mirror to a vehicle, a wall, an article of furniture, an ornamental object, an article of clothing, or a person;

receiving information from the source; and displaying the information on the array.

47. The method of 46, wherein displaying the information comprises displaying the information based upon at least one of input from an external source, user input, and programming.

48. The method of claim 46, wherein displaying the information comprises selecting states for the selectably reflective elements, wherein the elements are configured to selectably be in one of first and second optical states.

49. The method of claim 48, wherein at least one of the elements for which a state is selected has a shape corresponding to at least a portion of the information to be displayed by the at least one element.

50. The method of claim 46, wherein displaying the information comprises:

displaying a first optical characteristic on a first portion of the array; and displaying a second optical characteristic on a second portion of the array.

51. The method of claim 46, wherein the array is further configured to display an image according to received data.

52. The method of claim 51, wherein the mirror is further configured to function as a display in at least one of a cell phone, a computer, and a personal digital assistant.

53. A method of manufacturing a device comprising:

forming a substrate; and forming an array of reflective elements arranged on the substrate so as to produce an array of reflective elements configured to specularly reflect incident light so as to portray a reflected image, each element comprising:

a partially reflective layer;

a substantially reflective layer separated from the partially reflective layer by a predetermined space, wherein the space defines an interferometric cavity; and wherein one or more of the elements are configured to be selectably reflective.

54. The method of claim 53, wherein forming the array comprises configuring the elements to be selectably reflective based upon at least one of input from an external source, programming, and user input.

55. The method of claim 53, wherein forming the array comprises configuring one or more of the elements to be reflective across the visible spectrum.

56. The method of claim 53, wherein forming the array comprises configuring one or more of the elements to reflect light substantially of a different wavelength band than one or more other elements.

57. A device manufactured by the method of claim 53.

58. The method of claim 53, wherein the array is further configured to display an image according to received data.

59. The method of claim 58, wherein the mirror is further configured to function as a display in at least one of a cell phone, a computer, and a personal digital assistant.

* * * * *

UNITED STATES PATENT AND TRADEMARK OFFICE
CERTIFICATE OF CORRECTION

PATENT NO. : 7,317,568 B2  Page 1 of 1
APPLICATION NO. : 11/194046
DATED : January 8, 2008
INVENTOR(S) : Gally et al.

It is certified that error appears in the above-identified patent and that said Letters Patent is hereby corrected as shown below:

On the Title Page Item (73), "Assignee," Delete "San Fransisco" and insert -- San Francisco --, therefor.

Third Page, on the Title Page, Item (56) (U.S. Patent Documents), Line 26, Delete "Goosen" and insert -- Goossen --, therefor.

Fourth Page, on the Title Page, Item (56) (Other Publications), Line 7, Delete "Michromachining" and insert -- Micromachining --, therefor.

Fourth Page, on the Title Page, Item (56) (Other Publications), Line 25, Delete "4712." and insert -- 4712, --, therefor.

Fourth Page, on the Title Page, Item (56) (Other Publications), Line 38, Delete "1990-00" and insert -- 1999-00 --, therefor.

Column 4, Line 66, Delete "layers." and insert -- layers --, therefor.

Column 10, Line 39, Delete "diff-use" and insert -- diffuse --, therefor.

Column 14, Line 36, In Claim 10, after "wherein at least" delete "at least". (Repeated Occurrence)

Signed and Sealed this

Fifteenth Day of July, 2008

JON W. DUDAS
*Director of the United States Patent and Trademark Office*